Dec. 9, 1958   F. PRAPIS   2,864,001
DIRECT CURRENT MODULATOR
Original Filed Sept. 23, 1949
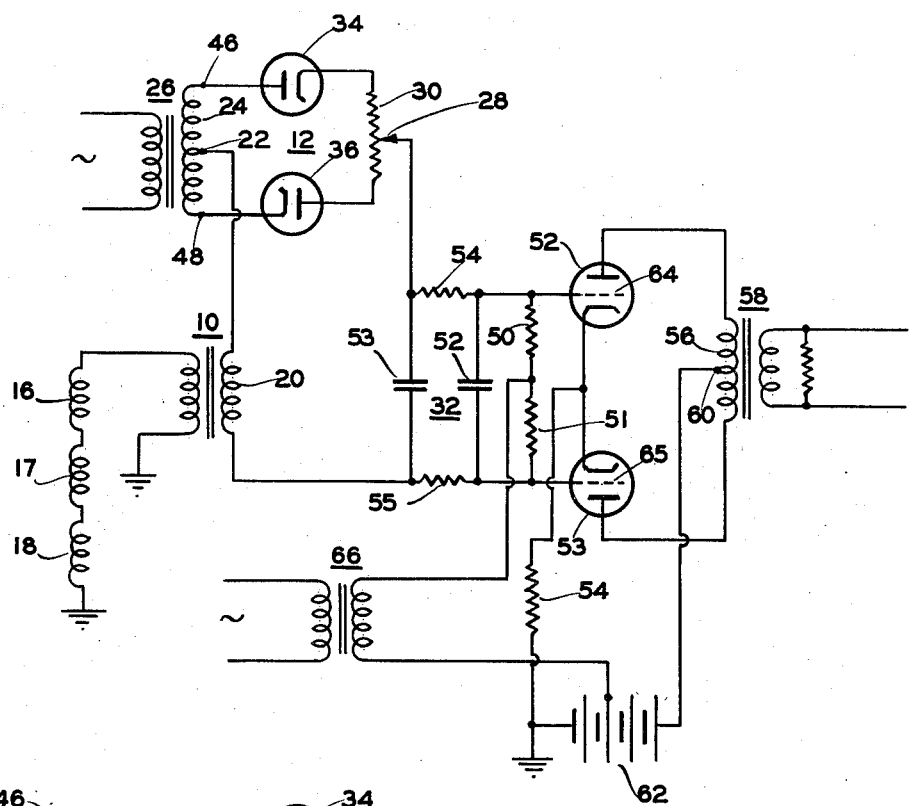
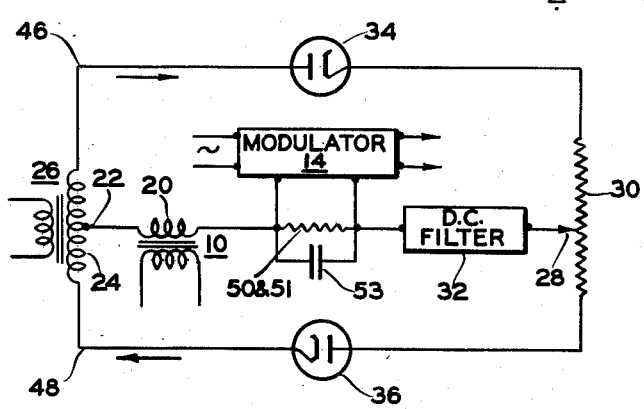
INVENTOR.
FRANK PRAPIS
BY
O. J. Brattie
ATTORNEY

United States Patent Office 2,864,001
Patented Dec. 9, 1958

2,864,001

DIRECT CURRENT MODULATOR

Frank Prapis, Paterson, N. J., assignor to Bendix Aviation Corporation, Teterboro, N. J., a corporation of Delaware Original application September 23, 1949, Serial No. 117,476. Divided and this application October 29, 1954, Serial No. 465,515

7 Claims. (Cl. 250—27)

The present invention relates generally to control circuits and, more particularly, to a circuit for producing a control effect as a function of a preselected component of a complex wave, and is a division of my copending application Serial No. 117,476, filed September 23, 1949, now abandoned.

Control members, such as rudders, elevators and ailerons of aircraft, for example, are usually operated in response to a resultant signal voltage derived by adding several signal voltages, each of which is responsive to a certain condition. The resulting signal voltage will contain a substantially sinusoidal component which is proportional to the sum of the several signal voltages and in addition thereto a spurious component 90 degrees out-of-phase therewith as well as components of higher frequencies.

Before such a complex signal voltage may be used, the out-of-phase component and the higher order frequency waves have to be separated from the useful component. The separation of the higher order frequencies may easily be accomplished by using a low pass filter, but in the past no simple means for eliminating the spurious 90 degrees out-of-phase component has been available. In the past this problem has been attacked by attempting to prevent as far as possible the spurious 90 degrees out-of-phase component from being picked up and then making allowances for the amount still present. In the present day systems such an error as introduced by the 90 degrees out-of-phase component is no longer permissible and means must be provided to separate it from the error signal before the error signal can be applied to the control device or the computer.

The present system contemplates the provision of novel means for producing a control effect directly proportional to the error signal and which will not be affected by the 90 degrees out-of-phase component or the higher order frequencies.

One of the objects of the present invention, therefore, is to provide novel and simple means for producing an effect as a function of one of two phase-displaced voltages.

Another object is to provide a simple circuit for producing a D. C. control voltage as a function of a preselected component of a complex wave.

Still another object is to provide means for producing a control effect as a function of a preselected desired component of a complex wave.

Still another object is to provide a simple circuit for developing a D. C. voltage as some function of a particular component of a complex signal voltage wave and to modulate an A. C. voltage of a preselected frequency, waveform and phase to energize control members or to be applied to a computer.

Still another object is to provide a simple, novel modulator having a limited output.

Still another object is to provide a simple, novel modulator which will produce an A. C. output voltage proportional to a D. C. input voltage up to a predetermined input voltage but which will not produce any increased output voltage for input voltages above said predetermined voltage.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for purpose of illustration and description only, and is not intended as a definition of the limits of the invention.

In the drawing, wherein like reference characters refer to like parts,

Fig. 1 is a schematic wiring diagram of a system embodying the invention; and

Fig. 2 is a simplified diagram of a portion of the circuit shown in Fig. 1.

For a better understanding of the invention, reference is had to Fig. 1 wherein an input transformer 10 is shown as being connected to a selective wave component detector generally indicated at 12 whose output is applied across the input of a balanced modulator generally indicated at 14.

A plurality of signal sources 16, 17 and 18, which may be the outputs of the pick-offs of an earth inductive device, or the pitch or bank pick-offs of a vertical gyroscope, for example, as well as the outputs of follow-up and trim signal generators of an aircraft automatic pilot are connected in series across the primary winding of input transformer 10, whose secondary winding 20 is connected on one side of detector 12 to the center-tap 22 of the secondary winding 24 of transformer 26 and on the other side of detector 12 to movable tap or slider 28 of resistor 30 through a load impedance designated by numeral 32. Rectifier tubes 34 and 36 are connected between opposite ends of secondary 24 and resistor 30 so as to conduct current flow in a clockwise direction through the loop comprising the secondary winding 24, tube 34, resistor 30 and tube 36, but to oppose current flow in the opposite direction. Slider 28 is so adjusted that there will be no potential difference between the slider 28 and center-tap 22 when transformer 26 is excited by an A. C. voltage and hence no current will flow through load 32 due to such excitation voltage. It will be noted that current will flow through the rectifier tubes only when terminal 46 of secondary winding 24 is positive with respect to terminal 48 thereof.

Load impedance 32 comprises series connected load resistances 50 and 51 shunted by a capacitor 52. In series with the load resistances and on either side thereof are limiting resistors 54 and 55 interconnected by capacitor 53. Capacitors 52, 53 and resistors 54, 55 constitute a filter for smoothing D. C. current pulses flowing from slider 28 to center-tap 22 and for eliminating high frequency voltages.

In order to facilitate the explanation of the operation of the circuit so far described it has been redrawn in a simplified manner in Fig. 2. An A. C. reference voltage is applied across the primary winding of transformer 26 and during the half cycle when point 46 of secondary winding 24 is positive relative to point 48, then rectifiers 34, 36 conduct, and during the other half cycle when point 46 of secondary winding 24 is negative relative to point 48, then the rectifiers do not conduct. Points 22 and 28 will be at the same potential and no voltage will appear across load resistors 50, 51. However, when an A. C. signal, comprising a sinusoidal error signal component of the same phase and frequency as the reference voltage, a spurious sinusoidal component displaced from the error signal by substantially 90 electrical degrees, and components of higher order frequency, is applied across the primary winding of transformer 10, the voltage across rectifier 34 will be one-half the sum of the reference voltage and error signal component and the voltage across rectifier 36 will be one-half the difference between the reference voltage and error signal component. Also, if an A. C. signal including an error signal component of the same frequency as and of opposite phase to the reference voltage is applied across the primary winding of transformer 10, then the voltage applied across rectifier 34 will be one-half the difference between the reference voltage and error signal component and the voltage across rectifier 36 will be one-half the sum of the reference voltage and error signal component. Thus, when an A. C. signal including an error signal component of the same frequency as the reference voltage and of the same or opposite phase is applied to the secondary winding 24 of transformer 26, the circuit is unbalanced and a current proportional to the error signal component flows through resistors 50, 51 during the half cycle rectifiers 34, 36 are rendered conductive by the reference voltage, and when no signal is applied, the circuit is balanced and no current flows through the load resistors. For proper operation the reference voltage must be of greater amplitude than the maximum error signal component to prevent conduction of the rectifiers during one half of the cycle. The D. C. voltage pulses flowing from slider 28 to point 22 are smoothed by the action of filter 32 to cause a substantially ripple-free D. C. voltage to appear across load resistances 50, 51. The filter will, of course, by-pass higher order frequencies.

It will be apparent from the symmetry of the circuit that the out-of-phase component will have no effect on the average value of the D. C. voltage because during the half cycle the rectifiers are conducting, the current will flow in one direction during the first quarter of the cycle and in the opposite direction during the second quarter. Thus the out-of-phase component will induce equal and opposite currents which over the period of conduction of the rectifiers will cancel each other and consequently will have no effect on the D. C. voltage.

In order to develop an A. C. voltage proportional to the D. C. voltage a modulator such as indicated at 14 in Fig. 1 may be used. Load resistances 50 and 51 are connected across the control grids of tubes 52a and 53a. The cathodes of tubes 52a and 53a are connected together and to ground through a common cathode resistor 54a, and the plates are connected to the opposite ends of the primary 56 of an output transformer 58. The plate supply voltage is provided by connecting center-tap 60 of primary winding 56 to a source of D. C. potential such as a battery 62.

The juncture of resistors 50 and 51 is connected to a tap on battery 62 to provide a proper D. C. operating potential on grids 64 and 65 of tubes 52a and 53a, respectively, through the secondary winding of a transformer 66. Transformer 66 is excited from a source of A. C. potential having a desired frequency and phase. With no voltage across resistors 50 and 51, tubes 52a and 53a will draw equal amounts of current and there will be no resultant voltage across the output of transformer 58. A D. C. voltage across resistors 50 and 51 will of course destroy the balance and one tube will conduct more than the other, and an A. C. output voltage proportional to such unbalance will be developed across transformer 58.

For many applications, such as when the modulated signal is fed to a computer, for instance, it may be desirable to limit the output of the modulator to a definite maximum value. In the modulator illustrated, the output is limited by the action of the common cathode resistor 54a.

As long as tubes 52a and 53a are operating on the straight portion of the grid voltage-plate current characteristic, the total current flowing through cathode resistor 54a will remain substantially constant because as the current through one tube is increased the current through the other tube is decreased by an equal amount. However, when one of the tubes approaches cut-off condition, no further decrease of current through the cathode resistor due to this tube will occur. Any further increase of plate current through the other tube will cause a corresponding increase in voltage across the cathode resistor and, hence, no further increase in output of the modulator can be effected by increasing the D. C. input voltage. In other words, when one tube approaches cut-off, the cathode resistance will have a degenerating effect on the other tube thereby preventing any further increase in output voltage from the modulator for additional D. C. drop across series connected resistances 50, 51.

Initial unbalance of the modulator may be corrected by adjusting slider 28 of resistor 30 so as to cause a current to flow through resistances 50, 51 due to the reference voltage in such a direction as to develop a voltage thereacross sufficient to compensate for the amount of unbalance.

It should be noted that the frequency of the reference voltage applied to the primary of transformer 26 must necessarily be of the same frequency and in phase with or of opposite phase to the desirable error signal voltage, but that the A. C. voltage at the output of modulator 14 may be of any convenient frequency.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A modulator having a limited output comprising a pair of electron tubes each having a plate, control electrode and a cathode, said plates being connected to opposite ends of the primary of an output transformer, a direct current supply connected to a center tap of said transformer, said cathodes being connected to ground potential through a common cathode resistor, means for applying an alternating current potential to said grids from a source of alternating current power, and means for applying a direct current signal to said grids of equal and opposite potential for providing an alternating current signal across the output transformer proportional to said direct current signal but limited in amplitude by the degenerating action of said common cathode resistor for large input signals.

2. A limited output modulator comprising a pair of electron tubes each having a plate, a cathode and a control grid, an output transformer having a primary winding connected across said plates and provided with a center tap connected to a source of direct current operating potential, a common cathode resistor for said cathodes, a source of direct current potentials connected to said grids, means for applying an alternating current potential to said grids in phase and of equal magnitude, and means for applying a direct current modulating signal to said grids of equal and opposite potential whereby an alternating signal modulated in accordance with said modulating signal will appear across said output transformer, said common cathode resistor limiting the modulated output to a predetermined amplitude.

3. A modulator having an output corresponding to a limited function of a desired signal component of an alternating error signal having another component in quadrature relationship to said desired component, comprising a pair of electron tubes each having a plate, control grid, and a cathode, said plates being connected to opposite ends of the primary of an output transformer, a direct current supply connected to a center tap of said transformer, said cathodes being connected to ground potential through a common cathode resistor, means for applying an alternating current reference voltage to said grids from a source of alternating current power, said reference voltage having a frequency the same as and selectively in phase and in phase opposition with said desired component, and means for applying to said grids a direct current signal corresponding to said desired signal component and of equal and opposite potential for providing an alternating current signal across the output transformer proportional to said signal but limited in amplitude by the degenerating action of said common cathode resistor for large input signals, said last named means including a normally balanced detector, means for energizing said detector with said alternating current reference voltage, said detector having rectifiers connected in series aiding relationship with said reference voltage and having an input, means for applying said error signal to said input thereby unbalancing said detector and producing said direct current signal and an alternating current signal corresponding to said quadrature component, and means for filtering out said last named alternating current signal.

4. A modulator having an output corresponding to a limited function of a desired signal component of an alternating current error signal having another component in quadrature relationship to said desired component, comprising a pair of electron tubes each having a plate, a control grid, and a cathode, said plates being connected to opposite ends of the primary of an output transformer, a direct current supply connected to a center tap of said transformer, said cathodes being connected to ground potential through a common cathode resistor, means for applying an alternating current reference voltage to said grids from a source of alternating current power, said reference voltage having a frequency the same as and selectively in phase and in phase opposition with said desired component, and means for applying to said grids a direct current signal corresponding to said desired signal component and of equal and opposite potential for providing an alternating current signal across the output transformer proportional to said signal but limited in amplitude by the degenerating action of said common cathode resistor for large input signals, said last named means including a normally balanced detector circuit having an input, means for energizing said detector with said alternating current reference voltage, said detector comprising rectifiers connected in series with said reference voltage to conduct during unipotential half cycles of said reference voltage, means for applying said error signal to said detector input to unbalance said detector to produce said direct current signal and to produce an alternating current signal corresponding to said quadrature component, and means for filtering out said last name alternating current signal.

5. A modulator having an output corresponding to a limited function of a desired signal component of an alternating current error signal having another component in quadrature relationship to said desired component, comprising a pair of electron tubes each having a plate, a control grid, and a cathode, said plates being connected to opposite ends of the primary of an output transformer, a direct current supply connected to a center tap of said transformer, said cathodes being connected to ground potential through a common cathode resistor, means for applying an alternating current reference voltage to said grids from a source of alternating current power, said reference voltage having a frequency the same as and selectively in phase and in phase opposition with said desired component, and means for applying to said grids a direct current signal corresponding to said desired signal component and of equal and opposite potential for providing an alternating current signal across the output transformer proportional to said signal but limited in amplitude by the degenerating action of said common cathode resistor for large input signals, said last named means including a normally balanced detector having an input, means for applying said error signal to said input, means for energizing said detector with said alternating current reference voltage, said detector comprising rectifiers connected so as to conduct during unipotential half cycles of said reference voltage to produce a direct current voltage corresponding to said desired component, and an alternating current voltage corresponding to said quadrature component, and means for filtering out said last named alternating current voltage.

6. A modulator having a limited output comprising an output transformer having a secondary winding and a center tapped primary winding, a direct current supply source, an alternating current supply source, a pair of electron tubes each having a plate, control grid and a cathode, said primary winding having opposite ends connected to said plates and a center tap connected to said direct current supply source, said cathodes being connected to ground potential through a common cathode resistor, means for applying an alternating current potential to said grids from said alternating current supply source, and means for applying a direct current signal to said grids of equal and opposite potential for providing an alternating current signal across said secondary winding proportional to said direct current signal but limited in amplitude for large input signals by the degenerating action of said common cathode resistor.

7. A modulator having an input and an output, comprising a transformer having a center tapped primary winding and a secondary winding, a pair of electron tubes each having a plate, a control grid and a cathode, said grids constituting said input and said secondary winding constituting said output, said plates being connected to opposite ends of said primary winding, a direct current supply source, means for connecting one terminal of said direct current supply source to the center tap of said primary winding, means including a common cathode resistor for connecting said cathodes to ground potential, whereby current may flow from said direct current source to ground through said plates, cathodes and common resistor, means for applying an alternating current potential to said grids, and means for applying a direct current signal to said grids of equal and opposite potential, whereby an alternating current signal is provided across the secondary winding proportional to said direct current signal but limited in amplitude by the degenerating action of said common cathode resistor for large input signals.

References Cited in the file of this patent

UNITED STATES PATENTS

| | | |
|---|---|---|
| 1,664,455 | King | Apr. 3, 1928 |
| 1,859,494 | Black | May 24, 1932 |
| 2,561,219 | Nyman | July 17, 1951 |